(12) United States Patent
Jung

(10) Patent No.: US 12,034,347 B2
(45) Date of Patent: Jul. 9, 2024

(54) MOTOR, AND BUSBAR FOR THE MOTOR

(71) Applicant: LG INNOTEK CO., LTD., Seoul (KR)

(72) Inventor: Young Hwan Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 273 days.

(21) Appl. No.: 17/767,135

(22) PCT Filed: Oct. 8, 2020

(86) PCT No.: PCT/KR2020/013788
§ 371 (c)(1),
(2) Date: Apr. 7, 2022

(87) PCT Pub. No.: WO2021/071309
PCT Pub. Date: Apr. 15, 2021

(65) Prior Publication Data
US 2022/0376579 A1    Nov. 24, 2022

(30) Foreign Application Priority Data

Oct. 10, 2019  (KR) .......................... 10-2019-0125391
Jan. 30, 2020  (KR) .......................... 10-2020-0011067

(51) Int. Cl.
*H02K 3/50*     (2006.01)
*H02K 1/16*     (2006.01)
(Continued)

(52) U.S. Cl.
CPC ............... *H02K 3/505* (2013.01); *H02K 1/16* (2013.01); *H02K 3/28* (2013.01); *H02K 5/225* (2013.01)

(58) Field of Classification Search
CPC ............ H02K 3/505; H02K 1/16; H02K 3/28; H02K 5/225; H02K 2203/09; H02K 3/50; H02K 13/00
(Continued)

(56) References Cited

U.S. PATENT DOCUMENTS 11,245,303 B2 *   2/2022   Kim ..................... H02K 29/08
11,336,144 B2 *   5/2022   Ryu ..................... H02K 3/51
(Continued)

FOREIGN PATENT DOCUMENTS

JP    2011-172473    9/2011
KR    10-2012-0048319    5/2012
(Continued)

OTHER PUBLICATIONS

International Search Report dated Jan. 18, 2021 issued in Application No. PCT/KR2020/013788.

*Primary Examiner* — Ahmed Elnakib
(74) *Attorney, Agent, or Firm* — KED & ASSOCIATES, LLP

(57) ABSTRACT

The present invention may provide a motor including a shaft, a rotor coupled to the shaft, a stator disposed to correspond to the rotor, and a busbar disposed above the stator, wherein the stator includes a stator core and coils, the busbar includes a busbar body and a plurality of terminals disposed on the busbar body, the terminals include terminal bodies, first protrusions extending from end portions of the terminal bodies and connected to end portions of the coils, and second protrusions branched off from the first protrusions and connected to power terminals, and the plurality of second protrusions are disposed at the same position in radial and vertical directions of the busbar and disposed at equal intervals in a circumferential direction of the busbar.

10 Claims, 20 Drawing Sheets

(51) Int. Cl.
  *H02K 3/28* (2006.01)
  *H02K 5/22* (2006.01)
(58) Field of Classification Search
  USPC .................................................. 310/179, 71
  See application file for complete search history.

(56) References Cited

U.S. PATENT DOCUMENTS

| | | | |
|---|---|---|---|
| 2006/0138883 A1* | 6/2006 | Yagai ................. | H02K 3/522 |
| | | | 310/179 |
| 2021/0057955 A1* | 2/2021 | Ryu ................... | H02K 1/165 |
| 2022/0069659 A1* | 3/2022 | Lee .................... | H02K 5/225 |
| 2022/0109347 A1* | 4/2022 | Hong .................. | H02K 3/522 |

FOREIGN PATENT DOCUMENTS

| | | |
|---|---|---|
| KR | 10-2015-0031634 | 3/2015 |
| KR | 10-2017-0052980 | 5/2017 |
| KR | 10-2018-0003399 | 1/2018 |

* cited by examiner

[FIG. 1]
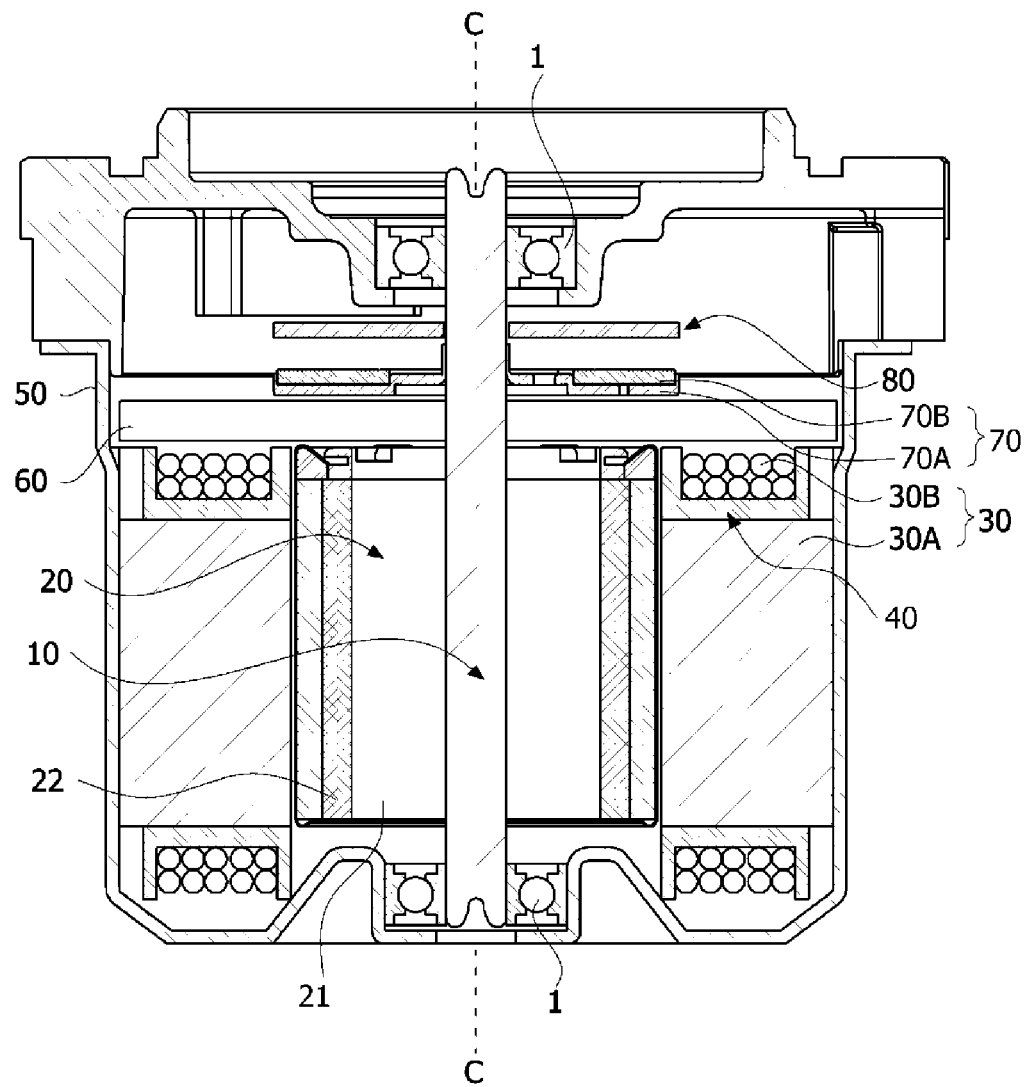

[FIG. 2]
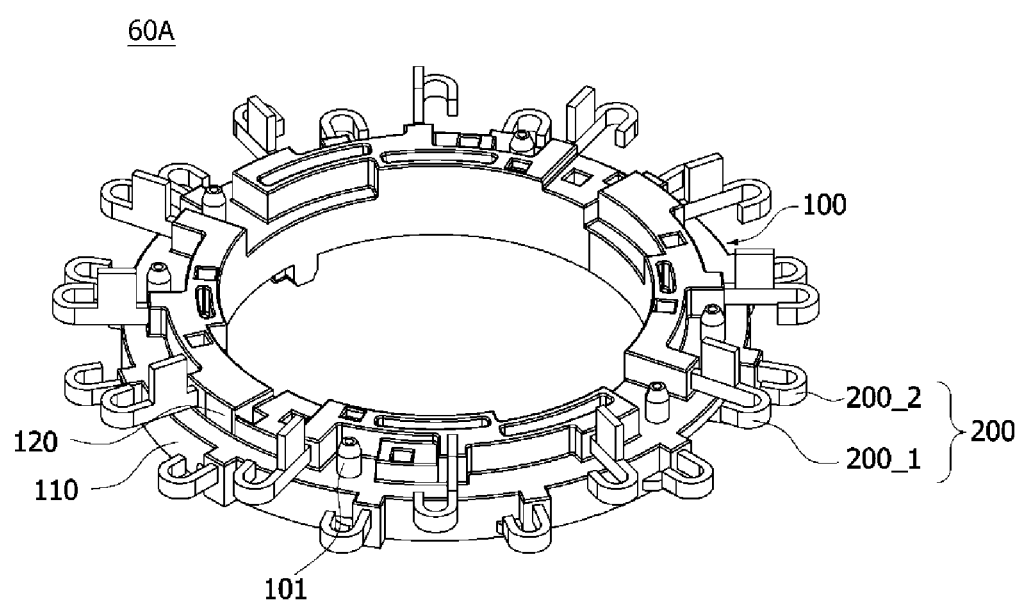

[FIG. 3]
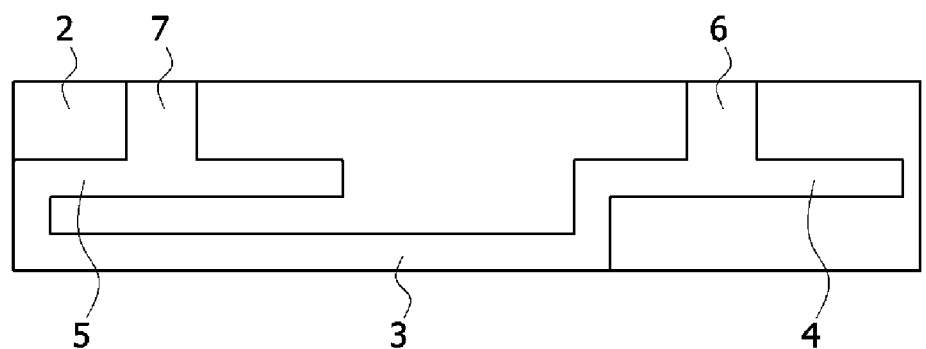

[FIG. 4]
200_1
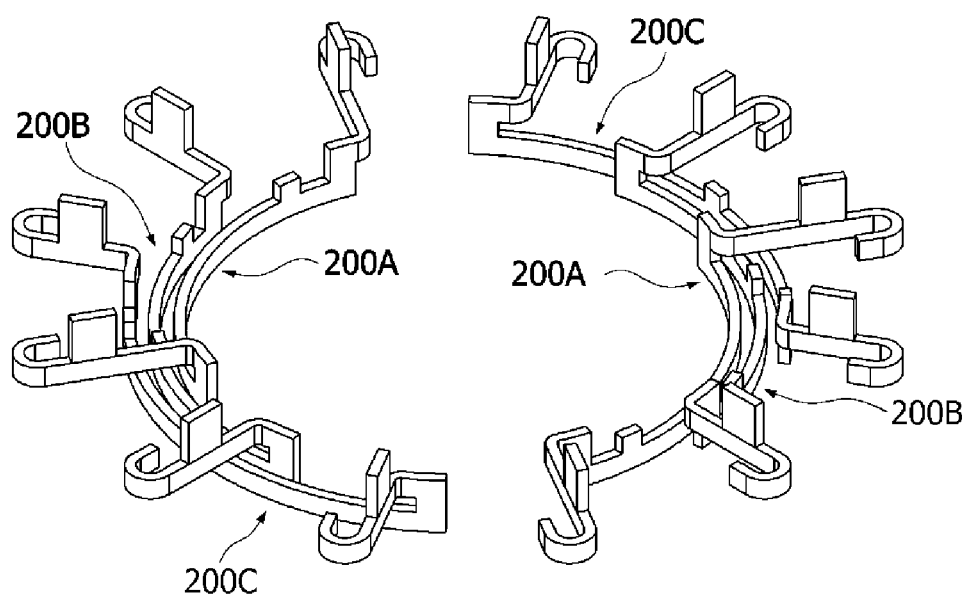

[FIG. 5]
200A
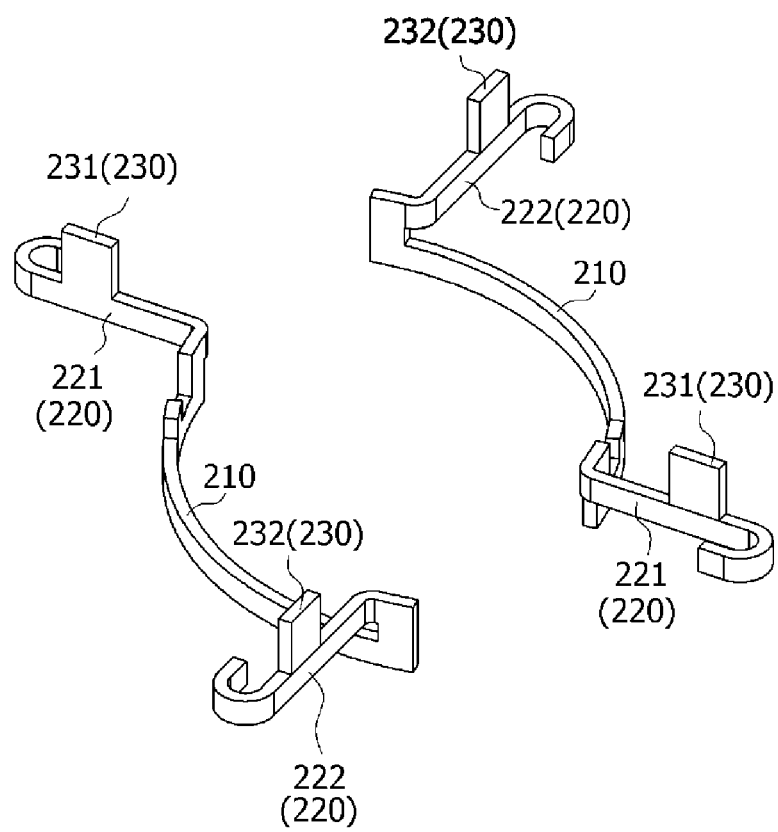

[FIG. 6]
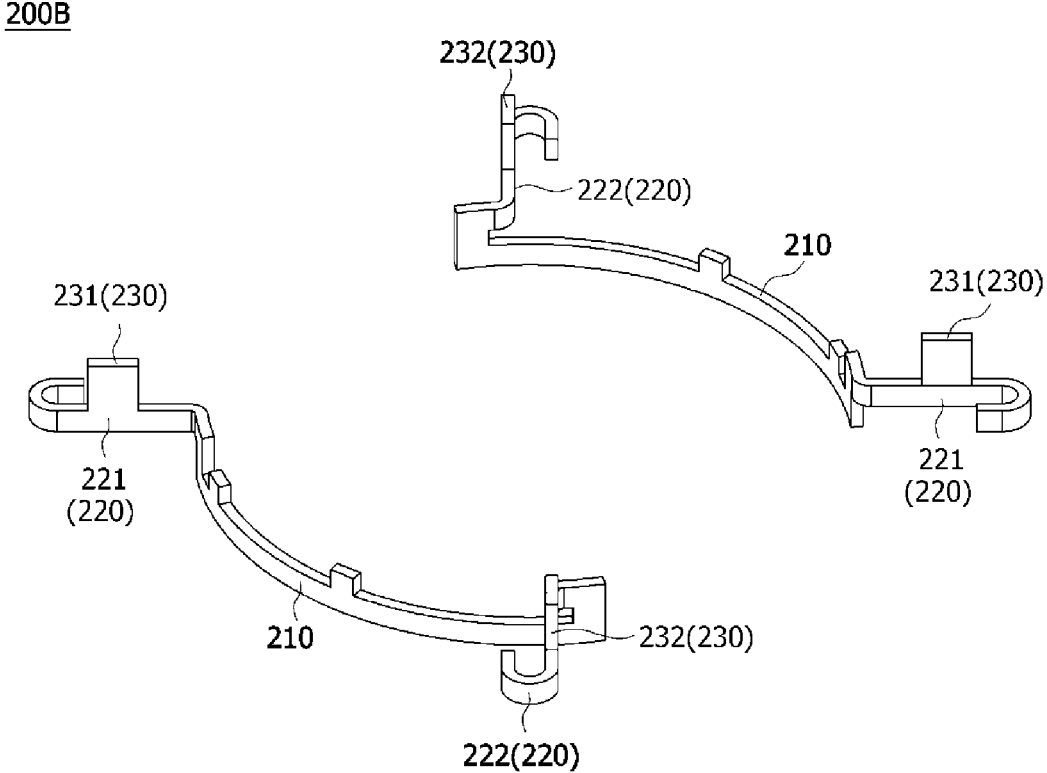

[FIG. 7]
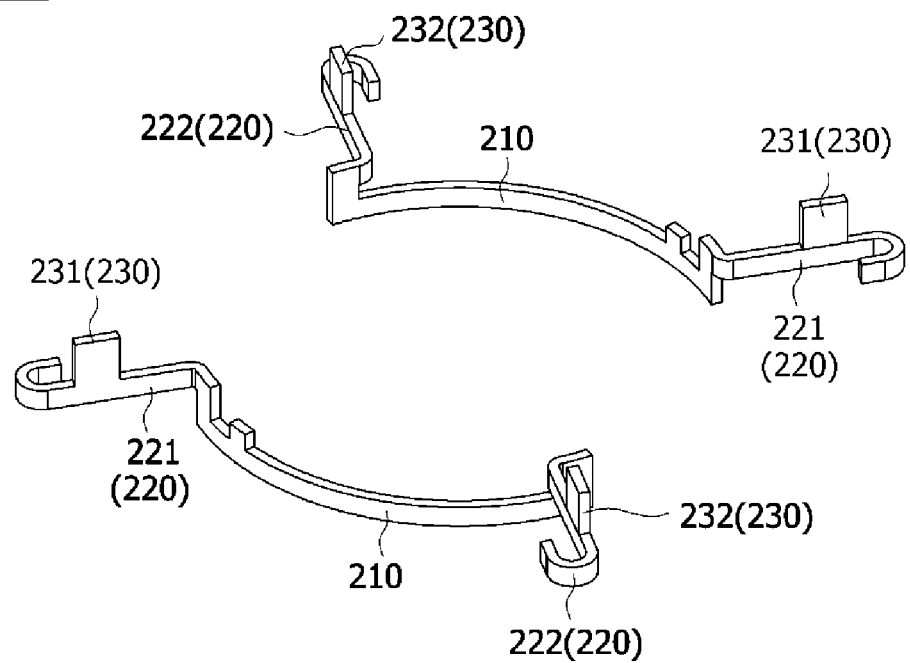

[FIG. 8]
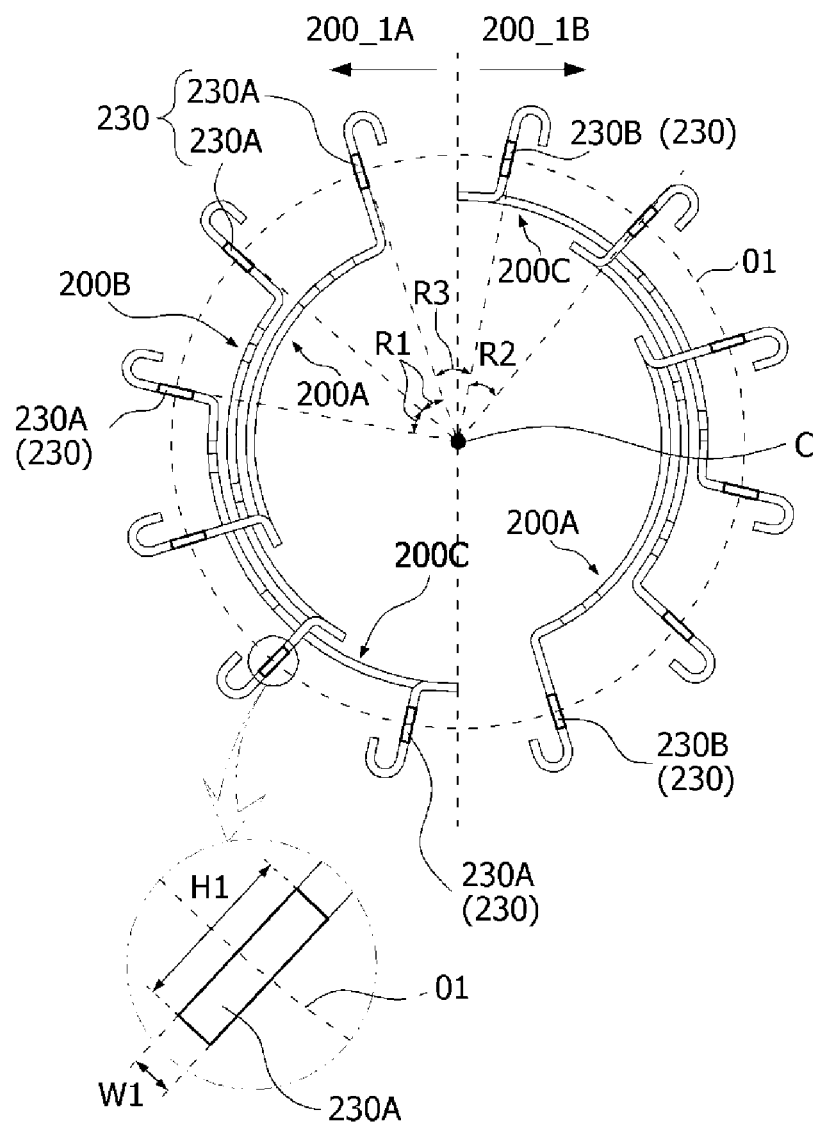

[FIG. 9]
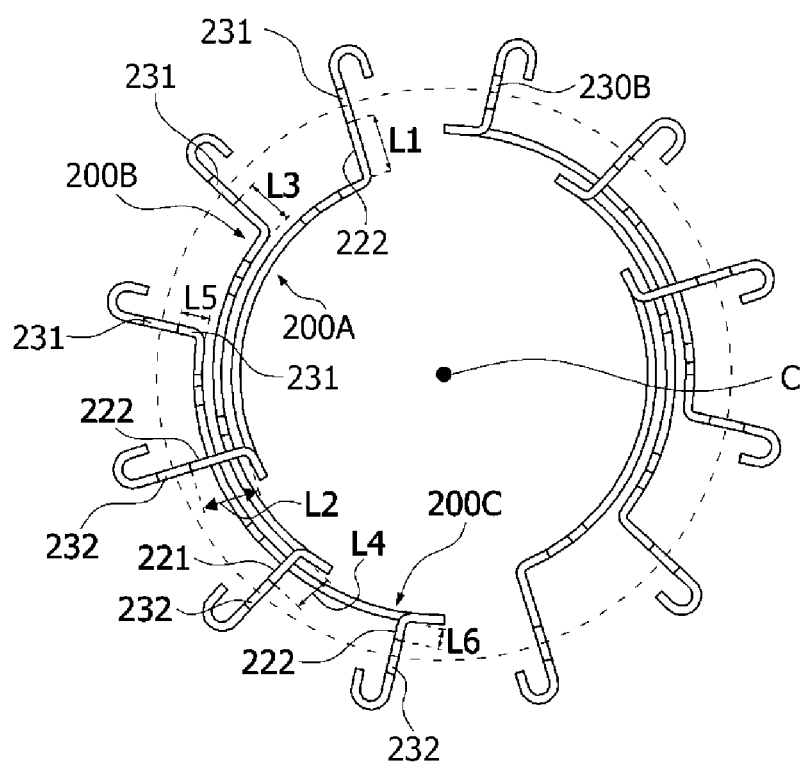

[FIG. 10]
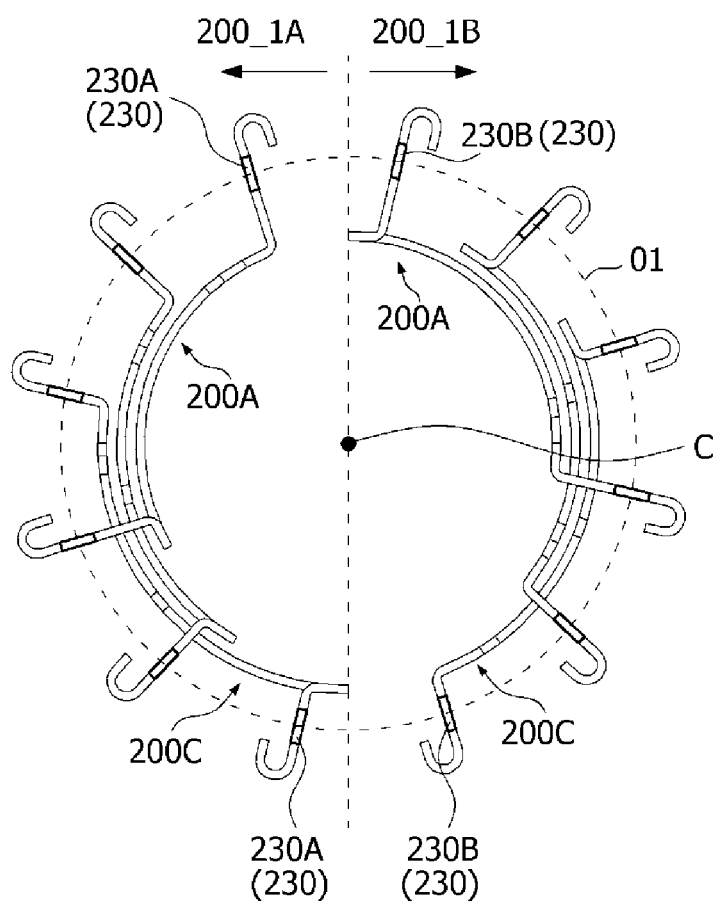

[FIG. 11]
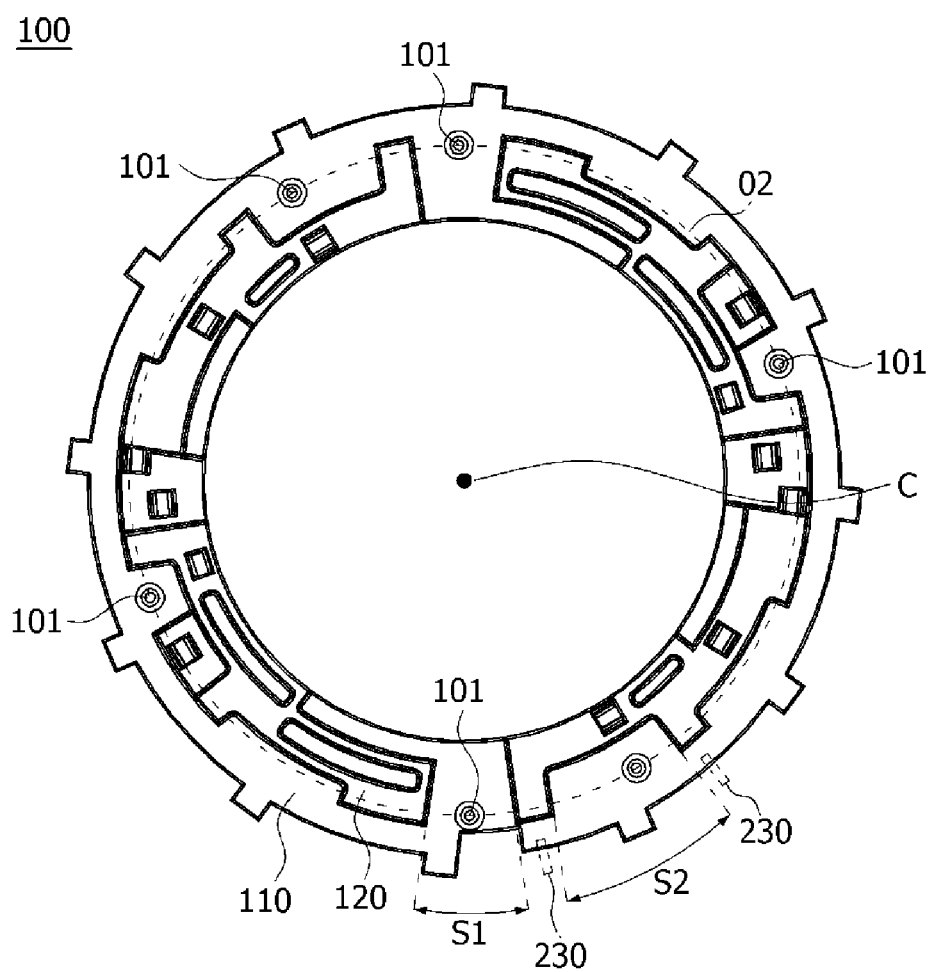

[FIG. 12]
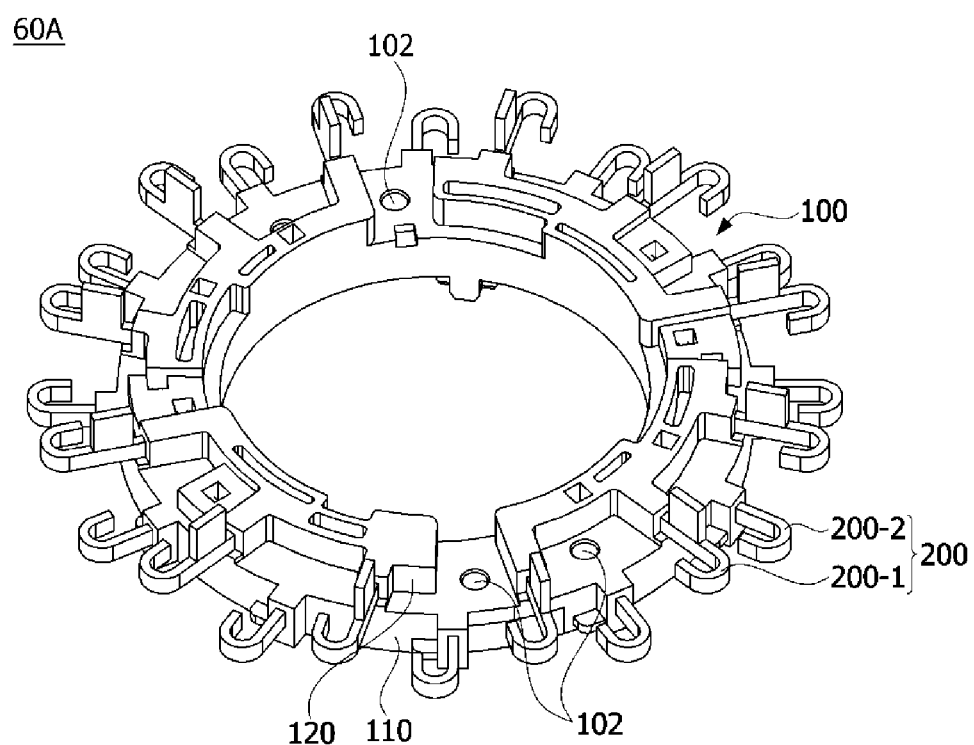

[FIG. 13]
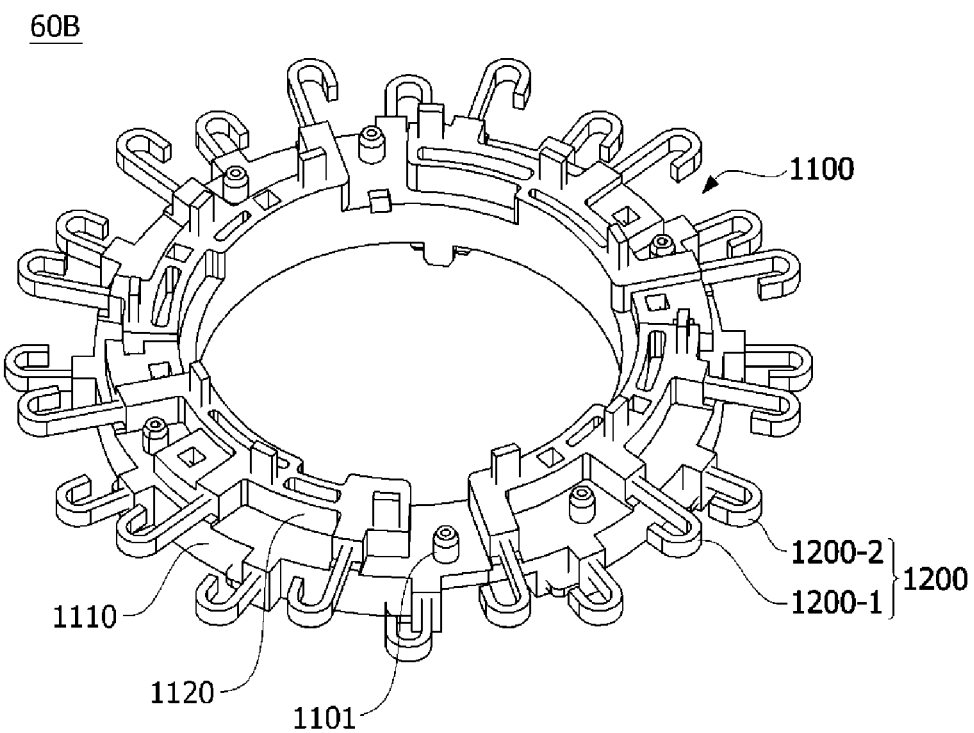

[FIG. 14]
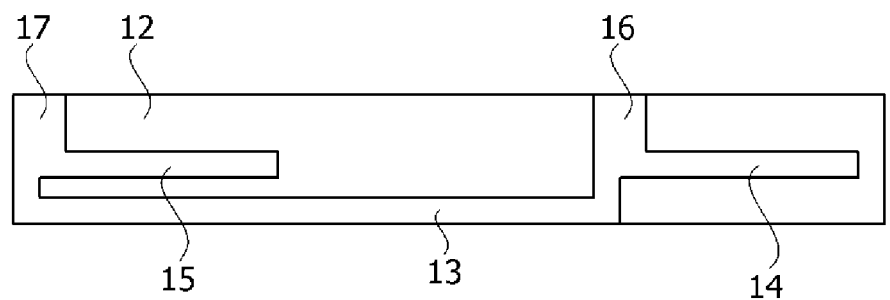

[FIG. 15]
1200-1
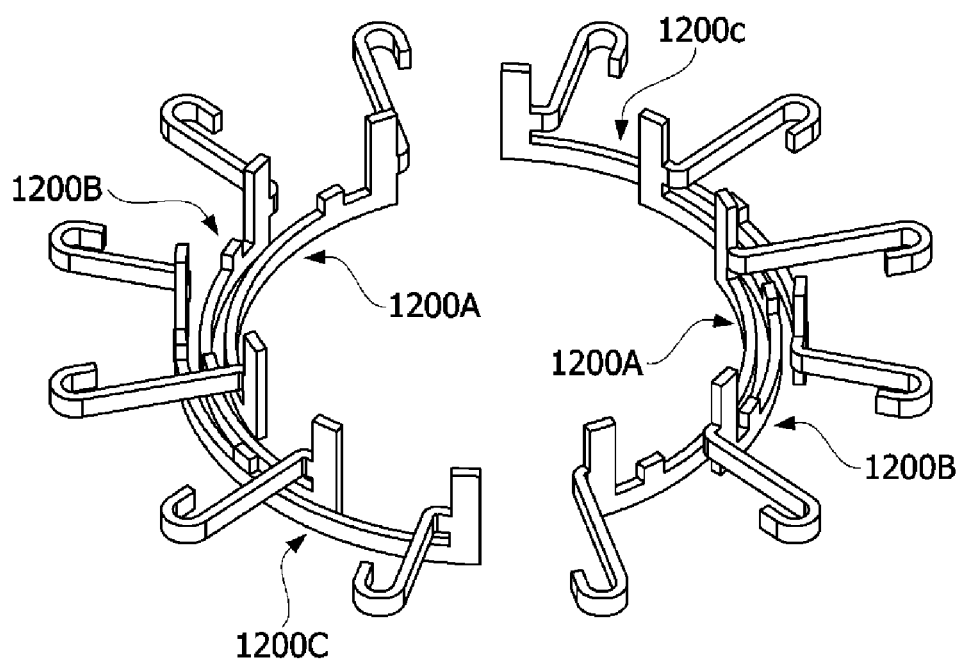

[FIG. 16]
1200A
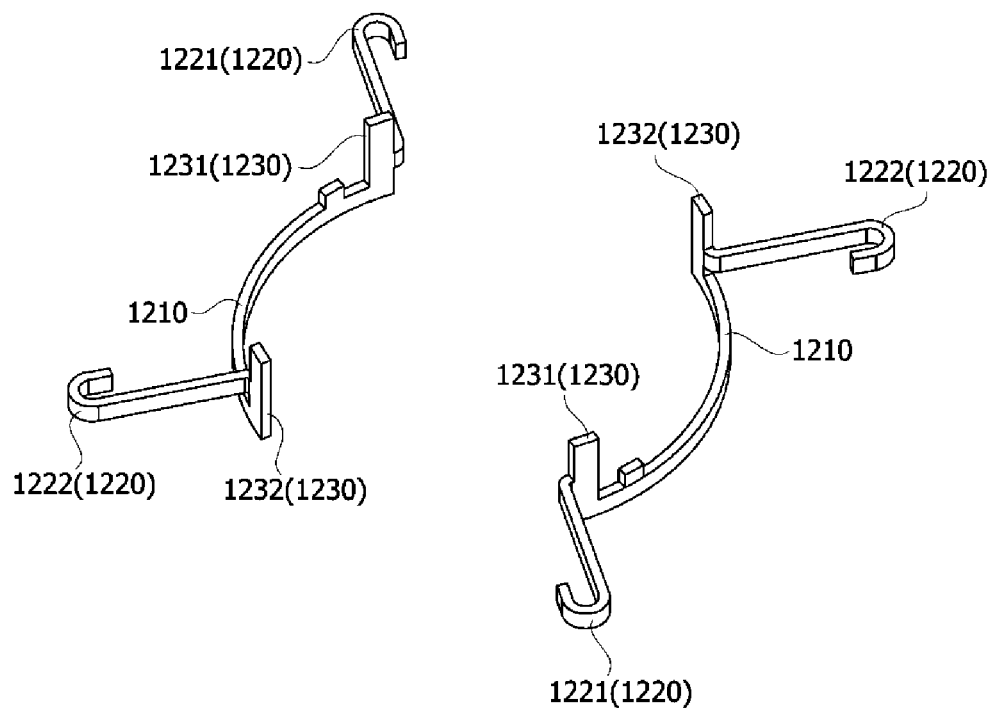

[FIG. 17]
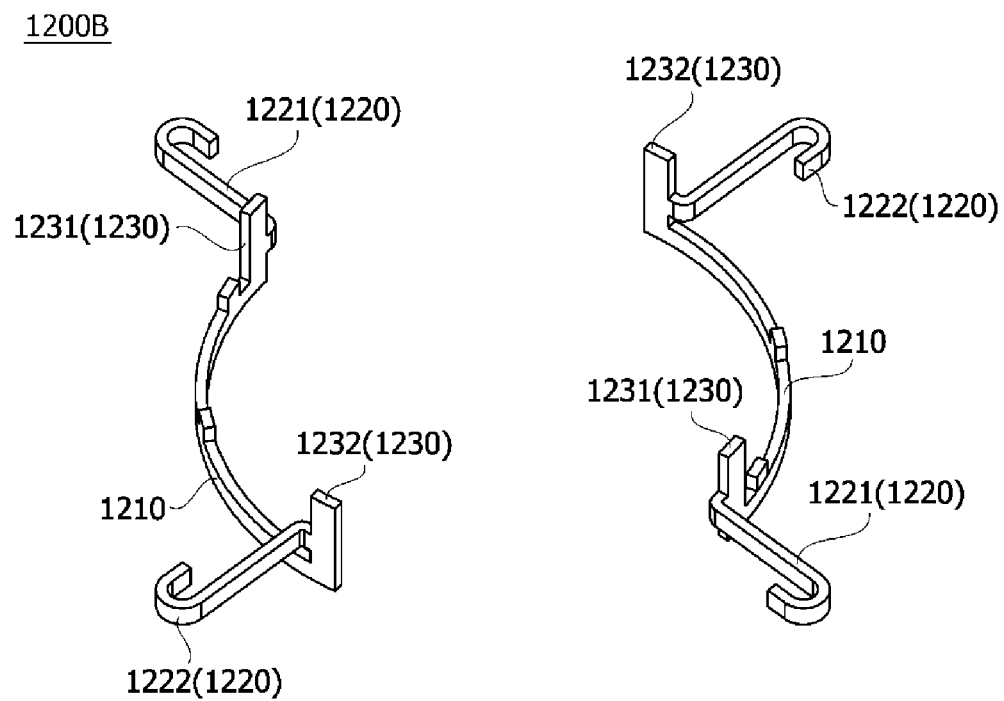

[FIG. 18]
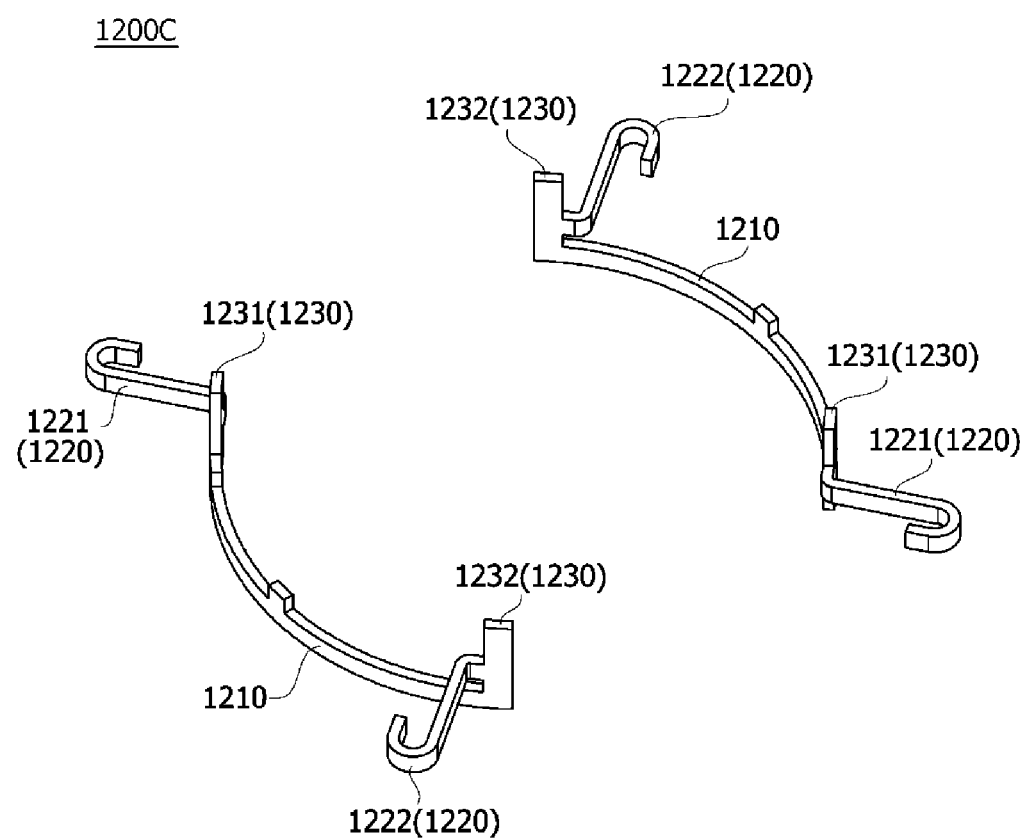

[FIG. 19]
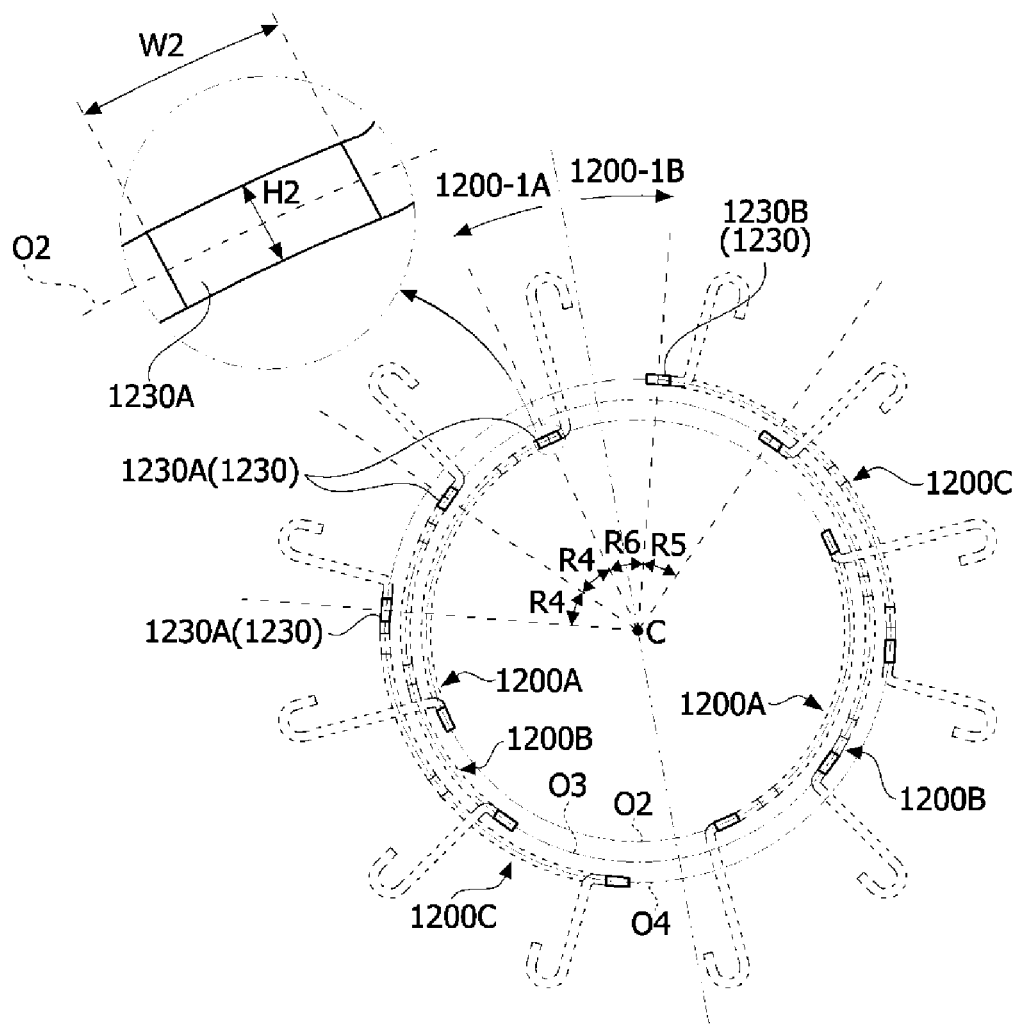

[FIG. 20]
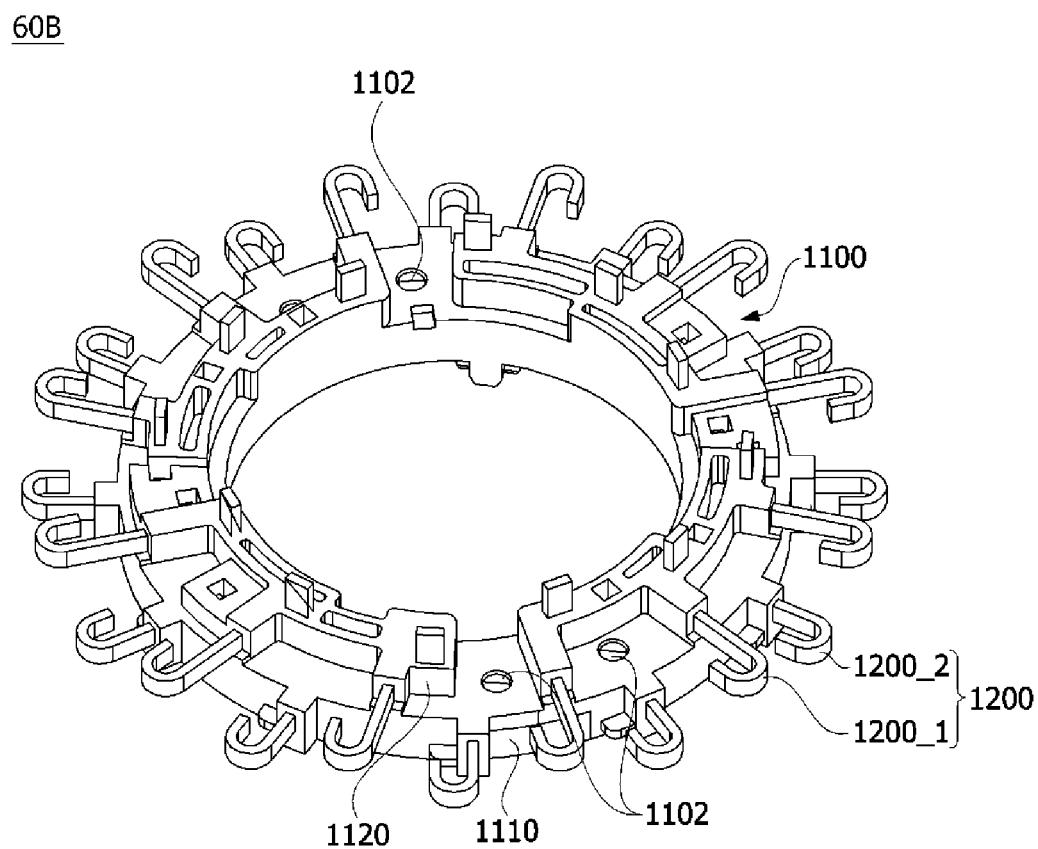

MOTOR, AND BUSBAR FOR THE MOTOR

CROSS-REFERENCE TO RELATED PATENT APPLICATIONS

This application is a U.S. National Stage Application under 35 U.S.C. § 371 of PCT Application No. PCT/KR2020/013788, filed Oct. 8, 2020, which claims priority to Korean Patent Application Nos. 10-2019-0125391, filed Oct. 10, 2019 and 10-2020-0011067, filed Jan. 30, 2020, whose entire disclosures are hereby incorporated by reference.

TECHNICAL FIELD

The present invention relates to a motor.

BACKGROUND ART

A motor includes a rotor and a stator. Coils are wound around the stator. Connection ends of the coils wound around the stator may be connected to a busbar. The busbar includes a busbar body and terminals. The terminals may be electrically connected to the connection ends of the coils. In addition, the terminals may be integrally formed with power terminals which are connected to an external power source.

The terminals may include terminal bodies, a plurality of connection ends extending from the terminal bodies, and the power terminals. The bodies of the terminals have substantially curved surfaces, and the connection ends and the power terminals have shapes that are branched off from the bodies and bent. Particularly, since the power terminals are connected to the external power source, there is a feature that lengths of the power terminals are long.

Accordingly, there is a problem that a shape of a development figure of a plate member for manufacturing the terminals is very complicated. When the shape of the development figure becomes complicated, a manufacturing process is complicated, and thus there is a problem that a large amount of scraps is generated in a terminal manufacturing process.

In addition, shapes and sizes of the terminals applied to a motor differ depending on positions of the power terminals. Accordingly, there are problems that not only does an amount of waste scraps considerably increase in a process of manufacturing various terminals but also the numbers of molds and processes for manufacturing the terminals increase.

DISCLOSURE

Technical Problem

The present invention is directed to providing a motor including a terminal of which a manufacturing process generates a small amount of scraps.

In addition, the present invention is directed to providing a motor which is compatible with various positions of power terminals.

Objectives to be solved by the present invention are not limited to the above-described objectives, and other objectives which are not described above will be clearly understood by those skilled in the art from the following specification.

Technical Solution

One aspect of the present invention provides a motor including a shaft, a rotor coupled to the shaft, a stator disposed to correspond to the rotor, and a busbar disposed above the stator, wherein the stator includes a stator core and coils, the busbar includes a busbar body and a plurality of terminals disposed on the busbar body, the terminals include terminal bodies, first protrusions extending from end portions of the terminal bodies and connected to end portions of the coils, and second protrusions branched off from the first protrusions and connected to power terminals, and the plurality of second protrusions are disposed at the same position in radial and vertical directions of the busbar and disposed at equal intervals in a circumferential direction of the busbar.

Another aspect of the present invention provides a motor including a shaft, a rotor coupled to the shaft, a stator disposed to correspond to the rotor, and a busbar disposed above the stator, wherein the stator includes a stator core and coils, the busbar includes a busbar body and a plurality of terminals disposed on the busbar body, the terminals include terminal bodies, first protrusions extending from end portions of the terminal bodies and connected to end portions of the coils, and second protrusions branched off from the first protrusions and connected to power terminals, the plurality of second protrusions are disposed at the same position in a vertical direction of the busbar and disposed at equal intervals in a circumferential direction of the busbar, and some of the plurality of second protrusions are disposed at positions different from positions of the remaining second protrusions in a radial direction of the busbar.

Shapes and sizes of the plurality of second protrusions may be the same.

The terminal bodies may include the plurality of first protrusions and the plurality of second protrusions.

The plurality of terminal bodies may be disposed at different positions in a radial direction of the busbar.

The first protrusions may include a 1-1 protrusion and a 1-2 protrusion, the 1-1 protrusion may extend from one end portion of the terminal body and may be connected to a first end portion of the coil, the 1-2 protrusion may extend from the other end portion of the terminal body and may be connected to a second end portion of the coil, the second protrusions may include a 2-1 protrusion and a 2-2 protrusion, the 2-1 protrusion may be disposed to be branched off from the 1-1 protrusion, and the 2-2 protrusion may be disposed to be branched off from the 1-2 protrusion.

The busbar body may include third protrusions protruding upward from an upper surface of the busbar body, and the third protrusions may be coupled to a body surrounding the power terminal.

The plurality of third protrusions may be disposed on the same orbit about a center of the busbar.

Each of the plurality of third protrusions may be disposed between the second protrusions in the circumferential direction of the busbar.

The plurality of third protrusions may be disposed further inward than the second protrusions in the radial direction of the busbar.

The busbar body may include holes disposed in an upper surface of the busbar body, and the holes may be coupled to a body surrounding the power terminals.

The plurality of holes may be disposed on the same circumference about the center of the busbar.

Each of the plurality of holes may be disposed between the second protrusions in the circumferential direction of the busbar.

The second protrusion may be a member of which a horizontal cross section has a rectangular shape, and a direction of a long side of the horizontal cross section may be the circumferential direction of the busbar In the radial direction of the busbar, the 2-1 protrusion may be disposed not to overlap the terminal body, and the 2-2 protrusion may be disposed to overlap the terminal body.

The second protrusion may include a member of which a horizontal cross section has a rectangular shape, and a direction of a long side of the horizontal cross section may be the circumferential direction of the busbar.

Among the plurality of terminal bodies, the plurality of second protrusions disposed on the same terminal body may be disposed on the same circumference about the center of the busbar, and the plurality of second protrusions disposed on the different terminal bodies may be disposed on different circumferences about the center of the busbar.

The second protrusion may be disposed to overlap the terminal body in the circumferential direction about the center of the busbar.

The second protrusion and the terminal body may be disposed on the same circumference about the center of the busbar.

Advantageous Effects

According to embodiments, since the present invention includes a terminal of which a manufacturing process generates a small amount of scraps, the present invention provides an advantageous effect of significantly reducing manufacturing costs.

According to the embodiments, the present invention provides an advantageous effect of being compatible with various positions of power terminals.

DESCRIPTION OF DRAWINGS

FIG. 1 is a view illustrating a motor according to an embodiment.

FIG. 2 is a perspective view illustrating a busbar.

FIG. 3 is a view illustrating a plate member for forming phase terminals of a busbar.

FIG. 4 is a perspective view illustrating phase terminals.

FIG. 5 is a perspective view illustrating first terminals.

FIG. 6 is a perspective view illustrating second terminals.

FIG. 7 is a perspective view illustrating third terminals.

FIG. 8 is a plan view illustrating the phase terminals.

FIG. 9 is a plan view illustrating the phase terminals illustrated in FIG. 8, which shows lengths of first protrusions in a radial direction extending to second protrusions in the radial direction.

FIG. 10 is a view illustrating a phase terminal according to a modified embodiment.

FIG. 11 is a plan view illustrating a busbar body.

FIG. 12 is a view illustrating a busbar in which a busbar body includes holes instead of third protrusions.

FIG. 13 is a perspective view illustrating a busbar according to a modified embodiment in which second protrusions are arranged in a circumferential direction.

FIG. 14 is a view illustrating a plate member for forming a phase terminal of a busbar.

FIG. 15 is a perspective view illustrating phase terminals.

FIG. 16 is a perspective view illustrating first terminals.

FIG. 17 is a perspective view illustrating second terminals.

FIG. 18 is a perspective view illustrating third terminals.

FIG. 19 is a plan view illustrating the phase terminals of the busbar illustrated in FIG. 13.

FIG. 20 is a view illustrating a busbar in which a busbar body includes holes instead of third protrusions.

MODES OF THE INVENTION

A direction parallel to a longitudinal direction (vertical direction) of a shaft is referred to as an axial direction, a direction perpendicular to the axial direction about a center of the shaft is referred to as a radial direction, and a direction along a circumference of a circle having a radii about the shaft is referred to as a circumferential direction.

FIG. 1 is a view illustrating a motor according to an embodiment.

Referring to FIG. 1, the motor according to the embodiment may include a shaft 10, a rotor 20, a stator 30, an insulator 40, a housing 50, a busbar 60, a sensing part 70, and a substrate 80. Hereinafter, the term "inward" refers to a direction from the housing 50 toward the shaft 10 which is a center of the motor, and the term "outward" refers to a direction opposite to "inward," that is, a direction from the shaft 10 toward the housing 50. In addition, a circumferential direction or radial direction is defined based on an axial center.

The shaft 10 may be coupled to the rotor 20. When an electromagnetic interaction occurs between the rotor 20 and the stator 30 when a current is supplied, the rotor 20 rotates, and the shaft 10 rotates in conjunction with the rotor 20. The shaft 10 is rotatably supported by bearings 1. The shaft 10 may be connected to a steering apparatus of a vehicle and transmit power to the steering apparatus.

The rotor 20 rotates due to the electrical interaction with the stator 30. The rotor 20 may be disposed to correspond to the stator 30 and disposed inside the stator 30. The rotor 20 may include a rotor core 21 and magnets 22 disposed on the rotor core 21. In this case, the rotor 20 may be a surface permanent magnet (SPM) type in which the magnets 22 are disposed on an outer circumferential surface of the rotor core 21.

The stator 30 is disposed outside the rotor 20. The stator 30 may include a stator core 30A, coils 30B, and an insulator 40 installed on the stator core 30A. The coils 30B may be wound around the insulator 40. The insulator 40 is disposed between the coils 30B and the stator core 30A to serve to electrically insulate the stator core 30A from the coils 30B. The coils 30B induce an electrical interaction with the magnets of the rotor 20.

The busbar 60 is disposed above the stator 30. The busbar 60 includes a busbar body 100 formed of an insulation material and a plurality of terminals coupled to the busbar body. In this case, the busbar body is formed of the insulation material to serve to prevent connection between the plurality of terminals. In addition, the plurality of terminals connect the coils 30B wound around the stator core 30A and serve to apply current to the coils.

The sensing part 70 may be coupled to the shaft 10. The sensing part 70 includes a sensing plate 70A and a sensing magnet 70B disposed on the sensing plate. A sensor which detects a magnetic force of the sensing magnet 70B may be disposed on the substrate 80. In this case, the sensor may be a Hall integrated circuit (IC) and serves to detect a magnetic flux of the sensing magnet 70B of the sensing part 70 coupled to the shaft 10. The sensing part 70 and the substrate 80 serve a function of detecting a position of the rotor 20 by detecting the magnetic flux which varies according to rotation.

FIG. 2 is a perspective view illustrating a busbar 60A.

Referring to FIGS. 1 and 2, the busbar 60A may include a busbar body 100 and terminals 200. The busbar body 100 may be an annular mold member. The busbar body 100 may include a first body 110 and second bodies 120. The second bodies 120 may be disposed on the first body 110, and thus the busbar body 100 may be disposed as a multistage structure in a vertical direction.

The terminals 200 may include phase terminals 200_1 connected to U-phase, V-phase, and W-phase power sources, and neutral terminals 200_2 connecting the phase terminals 200_1. The phase terminals 200_1 may not include a power terminal which is connected to an external power source, and the phase terminal 200_1 may be connected to a separate power terminal connected to the external power source.

The neutral terminals 200_2 may be disposed on the first body 110 of the busbar body 100. The phase terminals 200_1 may be disposed on the second bodies 120 of the busbar body 100.

Hereinafter, the terminal 200 will be described based on the phase terminal 200_1.

FIG. 3 is a view illustrating a plate member for forming the phase terminals 200_1 of the busbar 60A.

Referring to FIG. 3, the phase terminals 200_1 may be manufactured by performing a pressing process on a plate member 2. The plate member 2 may be a strap type member having a predetermined width. The plate member 2 may include a first region 3 for forming a terminal body 210 of the phase terminal 200_1, a second region 4 and a third region 5 for forming first protrusions 220 (see FIGS. 5, 6, and 7) of the phase terminal 200_1, and a fourth region 6 and a fifth region 7 for forming second protrusions 230 (see FIGS. 5, 6, and 7) of the phase terminal 200_1.

The first region 3 is disposed to extend along one edge of the plate member 2. The second region 4 may have a shape bent upward from one end of the first region 3 and bent outward from the first region 3 again. The third region 5 may have a shape bent upward from the other end of the first region 3 and bent inward from the first region 3 again. The second region 4 and the third region 5 may be formed to be bent in the same direction and extend in the same direction from the first region 3. The fourth region 6 may be a shape that is branched off upward from the second region 4. The fourth region 6 is formed to extend to the other edge of the plate member 2. The fifth region 7 may have a shape that is branched off upward from the third region 5. The fifth region 7 is also formed to extend to the other edge of the plate member 2.

A shape of the phase terminal 200_1 may be formed by the first region 3, the second region 4, the third region 5, the fourth region 6, and the fifth region 7 of the plate member 2.

FIG. 4 is a perspective view illustrating the phase terminals 200_1, FIG. 5 is a perspective view illustrating first terminals 200A, FIG. 6 is a perspective view illustrating second terminals 200B, and FIG. 7 is a perspective view illustrating third terminals 200C.

Referring to FIGS. 4 to 7, the phase terminals 200_1 may include the first terminals 200A, the second terminals 200B, and the third terminals 200C connected to the U-phase, V-phase, and W-phase power sources. One group of terminals including the first terminal 200A, the second terminal 200B, the third terminal 200C, and a neutral terminal 200_2 may be disposed as a pair.

Each of the first terminals 200A, the second terminals 200B, and the third terminals 200C may include a terminal body 210, the first protrusions 220, and the second protrusions 230.

The terminal body 210 of the first terminal 200A, the terminal body 210 of the second terminal 200B, and the terminal body 210 of the third terminal 200C may be disposed at different positions in a radial direction of the busbar 60A. Based on the terminal body 210, the first terminal 200A, the second terminal 200B, and the third terminal 200C may be disposed in order from the inside to the outside.

In addition, the first terminal 200A, the second terminal 200B, and the third terminal 200C may be disposed to include regions overlapping in the radial direction. The first terminal 200A, the second terminal 200B, and the third terminal 200C may be disposed to stand so that widths in the vertical direction are greater than widths in a horizontal direction which correspond to a thickness of the plate member 2.

The first protrusions 220 are protrusions in contact with end portions of the coils 30B. The first protrusions 220 are disposed to extend upward from end portions of the terminal body 210 and to be bent outward in the radial direction. Ends of the first protrusions 220 are disposed to be bent in hook shapes to surround first end portions (not shown) of the coils 30B. The first protrusions 220 may include a 1-1 protrusion 221 and a 1-2 protrusion 222. The 1-1 protrusion 221 may be disposed at one end portion of the terminal body 210. The 1-2 protrusion 222 may be disposed at the other end portion of the terminal body 210. The 1-1 protrusion 221 may be connected to the first end portion of the coil 30B. The 1-2 protrusion 222 may be connected to the first end portion (not shown) of the coil 30B which is the other coil 30B connected to the 1-1 protrusion 221. Although not illustrated in the drawings, a second end portion of the coil 30B may be connected to the neutral terminal 200_2.

The second protrusions 230 are protrusions in contact with separate power terminals. The second protrusions 230 are disposed to be branched off upward from the first protrusions 220. The second protrusions 230 may be rectangular members having flat surfaces. The second protrusions 230 may include a 2-1 protrusion 231 and a 2-2 protrusion 232. The 2-1 protrusion 231 may be branched off from the 1-1 protrusion 221. The 2-2 protrusion 232 may be branched off from the 1-2 protrusion 222.

The first terminals 200A, the second terminals 200B, and the third terminals 200C include the terminal bodies 210, the first protrusions 220, and the second protrusions 230, and shapes thereof are substantially the same, but lengths of the terminal bodies 210 in a circumferential direction or lengths of the first protrusions 220 may be different. However, sizes and shapes of the second protrusions 230 of the first terminals 200A, the second terminals 200B, and the third terminals 200C may be the same. This is so that the phase terminal 200_1 can be commonly used to correspond to the power terminals at various positions.

FIG. 8 is a plan view illustrating the phase terminals 200_1.

Referring to FIG. 8, the plurality of second protrusions 230 disposed in all the phase terminals 200_1 are disposed at the same position in the radial and vertical directions of the busbar 60A. In addition, the plurality of second protrusions 230 may be disposed at equal intervals in a circumferential direction of the busbar 60A.

The second protrusions 230 are rectangular members of which horizontal cross sections have widths W1 greater than lengths H1. In this case, a direction of a long side of each of the horizontal cross sections may be the radial direction of the busbar 60A. Centers of widths of horizontal cross sections of the plurality of second protrusions 230 in the radial direction may be disposed on the same orbit about a center C of the busbar 60A. Accordingly, the plurality of second protrusions 230 may be radially disposed about the center C of the busbar 60A.

The plurality of second protrusions 230 may be disposed at equal intervals in the circumferential direction of the busbar 60A. For example, the phase terminals 200_1 may be divided into the phase terminals 200_1 of a first group 200_1A (hereinafter referred to as the first group 200_1A) and the phase terminals 200_1 of a second group 200_1B (hereinafter referred to as the second group 200_1B) which are electrically separated. The first group 200_1A and the second group 200_1B may be disposed to be divided with respect to a virtual straight line passing through the center C of the busbar 60A. In addition, the first group 200_1A and the second group 200_1B may be disposed to be rotationally symmetrical with respect to the center C of the busbar 60A. Alternatively, the first group 200_1A and the second group 200_1B may also be disposed to be symmetrical with respect to the virtual straight line passing through the center C of the busbar 60A.

In this case, a first angle R1 of the first group 200_1A may be the same as a second angle R2 of the second group 200_1B. In this case, the first angle R1 is an angle which forms a distance between the second protrusions 230 of the phase terminals 200_1 of the first group 200_1A in the circumferential direction, and the second angle R2 denotes an angle which forms a distance between the second protrusions 230 of the phase terminals 200_1 of the second group 200_1B in the circumferential. A reference for each of the first angle R1 and the second angle R2 corresponds to the width center of the horizontal cross section of each of the second protrusions 230 in the circumferential direction.

A third angle R3 between the first group 200_1A and the second group 200_1B may also be the same as the first angle R1 or the second angle R2. In this case, the third angle R3 is an angle which forms a distance in the circumferential direction between a second protrusion 230A of the first group 200_1A and a second protrusion 230B of the second group 200_1B which are adjacent to each other. A reference for the third angle R3 corresponds to the width center of the horizontal cross section of each the second protrusions 230 in the circumferential direction.

FIG. 9 is a plan view illustrating the phase terminals 200_1 illustrated in FIG. 8, which shows lengths of the first protrusions 220 in the radial direction extending to the second protrusions 230 in the radial direction.

Referring to FIG. 9, hereinafter, the length of the first protrusion 220 in the radial direction extending to the second protrusion 230 in the radial direction is simply called a length. Lengths L1 and L2 of the first terminals 200A positioned relatively inward may be greater than lengths L3 and L4 of the second terminals 200B. In addition, lengths L5 and L6 of the third terminals 200C positioned relatively outward may be smaller than lengths L3 and L4 of the second terminals 200B.

Meanwhile, in the first terminals 200A, the second terminals 200B, and the third terminals 200C, the lengths L1, L3, and L5 of the 1-1 protrusions 221 and the lengths L2, L4, and L6 of the 1-2 protrusions 222 may be the same.

FIG. 10 is a view illustrating a modified example of the phase terminals 200_1.

Referring to FIGS. 8 and 10, in the case of FIG. 8, a second protrusion 230A of the first group 200_1A and a second protrusion 230B of the second group 200_1B, which are adjacent to each other, are disposed on the terminals disposed at the different positions in the radial direction. For example, the second protrusion 230A of the first group 200_1A is disposed on the first terminal 200A, and the second protrusion 230B of the second group 200_1B is disposed on the third terminal 200C of which a position is different from a position of the first terminal 200A in the radial direction.

Conversely, in the case of FIG. 10, the second protrusion 230A of the first group 200_1A and the second protrusion 230B of the second group 200_1B, which are adjacent to each other, may be disposed on the terminals disposed at the same position in the radial direction. For example, the second protrusion 230A of the first group 200_1A may be disposed on the first terminal 200A, and the second protrusion 230B of the second group 200_1B may also be disposed on the other first terminal 200A of which a position is the same as a position of the first terminal 200A in the radial direction FIG. 11 is a plan view illustrating the busbar body 100.

Referring to FIGS. 2 and 11, the busbar body 100 may include a plurality of third protrusions 101. The plurality of third protrusions 101 protrude upward from an upper surface of the first body 110 of the busbar body 100. The third protrusions 101 may be coupled to a body surrounding the power terminals. The third protrusions 101 are for arranging positions of the power terminals coupled to the busbar 60A and the second protrusions 230. The third protrusions 101 may have cylindrical shapes, and upper end portions of the third protrusions 101 may have cone shapes.

Centers of the plurality of third protrusions 101 may be disposed on the same orbit about the center C of the busbar 60A. This is so that the phase terminal 200_1 can be commonly used to correspond to the positions of the various power terminals.

The third protrusions 101 may be disposed further inward than the second protrusions 230 in the radial direction of the busbar 60A. In addition, the third protrusions 101 may be disposed not to overlap the second protrusions 230 in the circumferential direction of the busbar 60A. That is, each of the third protrusions 101 may be disposed between the adjacent second protrusions 230 in the circumferential direction of the busbar 60A.

Empty spaces S1 and S2 having predetermined widths in the circumferential direction may be formed by the second bodies 120 of the busbar body 100. The third protrusions 101 may be disposed in the empty spaces S1 and S2. The empty spaces S1 and S2 may be spaces separating the second bodies 120 from each other like the spaces S1 of FIG. 11 and grooves of the second bodies 120 concavely formed in the radial direction like the spaces S2 of FIG. 11. The third protrusions 101 may be disposed in the empty spaces S1 and S2. Side surfaces of the second bodies 120, which constitute boundaries of the empty spaces S1 and S2, serve to guide the power terminals in a process of coupling the power terminals to the busbar 60A.

FIG. 12 is a view illustrating the busbar 60A in which the busbar body 100 includes holes 102 instead of the third protrusions 101.

Referring to FIG. 12, the busbar 60A according to a modified example may include the holes 102 instead of the third protrusions 101. The busbar body 100 may include the plurality of holes 102. The plurality of holes 102 may be concavely formed in an upper surface of the busbar body 100. The holes 102 may be coupled to protruding structures of the body surrounding the power terminals. The holes 102 are also for arranging the positions of the power terminals coupled to the busbar 60A and the second protrusions 230. Centers of the plurality of holes 102 may be disposed on the same orbit about the center C of the busbar 60A. This is so that the phase terminal 200_1 can be commonly used to correspond to positions of the various power terminals. The holes 102 may be disposed not to overlap the second protrusions 230 in the circumferential direction of the busbar 60A. That is, each of the holes 102 may be disposed between the adjacent second protrusions 230 in the circumferential direction of the busbar 60A.

FIG. 13 is a perspective view illustrating a busbar 60B according to a modified embodiment in which second protrusions 1230 are arranged in a circumferential direction. Referring to FIG. 13, the busbar 60B may include a busbar body 1100 and terminals 1200. The terminals 1200 may include phase terminals 1200_1 connected to U-phase, V-phase, and W-phase power sources and neutral terminals 1200_2 connecting the phase terminals 1200_1.

The busbar body 1100 may include a plurality of third protrusions 1101. The plurality of third protrusions 1101 protrude upward from an upper surface of a first body 1110 of the busbar body 1100. The third protrusions 1101 may be coupled to a body surrounding power terminals. The third protrusions 1101 are for arranging positions of the power terminals coupled to the busbar 60B and the second protrusion 1230.

FIG. 14 is a view illustrating a plate member 12 for forming the phase terminal 1200_1 of the busbar 60B.

Referring to FIG. 14, the plate member 12 may include a first region 13 for forming a terminal body 1210 of the phase terminal 1200_1, a second region 14 and a third region 15 for forming first protrusions 1220 of the phase terminal 1200_1, and a fourth region 16 and a fifth region 17 for forming second protrusions 1230 of the phase terminal 1200_1. In this case, the fourth region 16 is positioned at an end of the second region 14, and the fifth region 17 is positioned at an end of the third region 15.

FIG. 15 is a perspective view illustrating the phase terminals 1200_1, FIG. 16 is a perspective view illustrating first terminals 1200A, FIG. 17 is a perspective view illustrating second terminals 1200B, and FIG. 18 is a perspective view illustrating third terminals 1200C.

Referring to FIGS. 15 to 18, the phase terminals 1200_1 may include the first terminals 1200A, the second terminals 1200B, and the third terminals 1200C connected to U-phase, V-phase, and W-phase power sources. Each of the first terminals 1200A, the second terminals 1200B, and the third terminals 1200C may include a terminal body 1210, first protrusions 1220, and second protrusions 1230.

The terminal body 1210 of the first terminal 1200A, the terminal body 1210 of the second terminal 1200B, and the terminal body 1210 of the third terminal 1200C may be disposed at different positions in a radial direction of the busbar 60B. Based on the terminal body 1210, the first terminal 1200A, the second terminal 1200B, and the third terminal 1200C may be disposed in order from the inside to the outside.

In addition, the first terminal 1200A, the second terminal 1200B, and the third terminal 1200C may be disposed to include regions overlapping in the radial direction. The first terminal 1200A, the second terminal 1200B, and the third terminal 1200C may be disposed to stand so that widths in a vertical direction are greater than widths in a horizontal direction which correspond to a thickness of the plate member 12.

The first protrusions 1220 are disposed to extend upward from end portions of the terminal body 1210 and to be bent outward in the radial direction. Ends of the first protrusions 1220 are disposed to be bent in hook shapes to surround first end portions (not shown) of coils 30B. The first protrusions 1220 may include a 1-1 protrusion 1221 and a 1-2 protrusion 1222. The 1-1 protrusion 1221 may be disposed at one end portion of the terminal body 1210. The 1-2 protrusion 1222 may be disposed at the other end portion of the terminal body 1210. The 1-1 protrusion 1221 may be connected to the first end portion of the coil 30B. The 1-2 protrusion 1222 may be connected to the first end portion (not shown) of the coil 30B which is the other coil 30B connected to the 1-1 protrusion 1221. Although not illustrated in the drawings, a second end portion of the coil 30B may be connected to the neutral terminal 1200_2.

The second protrusions 1230 are disposed to be branched off upward from first protrusions 1220. The second protrusions 1230 may be rectangular members having flat surfaces. In addition, the second protrusions 1230 may be members of which horizontal cross sections have rectangular shapes, and a direction of a long side of each of the horizontal cross sections may be the circumferential direction of the busbar 60B. The second protrusions 1230 may protrude from connection portions of the first protrusions 1220 and the terminal body 1210. Accordingly, the second protrusions 1230 are disposed at one sides of the first protrusions 1220.

The second protrusions 1230 may include a 2-1 protrusion 1231 and a 2-2 protrusion 1232. The 2-1 protrusion 1231 may be branched off from the 1-1 protrusion 1221. The 2-2 protrusion 1232 may be branched off from the 1-2 protrusion 1222.

The first terminals 1200A, the second terminals 1200B, and the third terminals 1200C include the terminal bodies 1210, the first protrusions 1220, and the second protrusions 1230, and shapes thereof are substantially the same, but lengths of the terminal bodies 1210 in the circumferential direction or lengths of the first protrusions 1220 may be different. However, sizes and shapes of the second protrusions 1230 of the first terminals 1200A, the second terminals 1200B, and the third terminals 1200C may be the same. This is so that the phase terminal 1200_1 can be commonly used to correspond to the power terminals 1200 at various positions.

FIG. 19 is a plan view illustrating the phase terminals 1200_1 of the busbar 60B illustrated in FIG. 13.

Referring to FIG. 19, the plurality of second protrusions 1230 disposed in all the phase terminals 1200_1 are disposed at the same position in the radial and vertical directions of the busbar 60B. In addition, the plurality of second protrusions 1230 may be disposed at equal intervals in the circumferential direction of the busbar 60B.

For example, the second protrusions 1230 are rectangular members of which horizontal cross sections have widths W2 greater than lengths H2. In this case, a direction of a long side of each of the horizontal cross sections may be the circumferential direction of the busbar 60B.

Some of the plurality of second protrusions 1230 may be disposed at positions different from positions of the other second protrusions 1230 of the busbar 60B in the radial direction. For example, based on a center C of the busbar 60B, the second protrusions 1230 may be disposed to overlap the terminal bodies 1210. Specifically, the plurality of second protrusions 1230 disposed on the same terminal body 1210 may be disposed on the same circumference about the center of the busbar 60B.

Accordingly, the plurality of second protrusions 1230 disposed on the first terminals 1200 may be disposed on a first circumference O1 about the center C of the busbar 60B. The plurality of second protrusions 1230 disposed on the second terminals 1200 may be disposed on a second circumference O2 about the center C of the busbar 60B. The plurality of second protrusions 1230 disposed on the third terminals 1200 may be disposed on a third circumference O3 about the center C of the busbar 60B. The first circumference O1, the second circumference O2, and the third circumference O3 have different radii.

The plurality of second protrusions 1230 may be disposed at equal intervals in the circumferential direction of the busbar 60B. For example, the phase terminals 1200_1 may be divided into the phase terminals 1200_1 of a first group 1200_1A (hereinafter referred to as the first group 1200_1A) and the phase terminals 1200_1 of a second group 1200_1B (hereinafter referred to as the second group 1200_1B) which are electrically separated. The first group 1200_1A and the second group 1200_1B may be disposed to be divided with respect to a virtual straight line passing through the center C of the busbar 60B. In addition, the first group 1200_1A and the second group 1200_1B may be disposed to be rotationally symmetrical with respect to the center C of the busbar 60B. Alternatively, the first group 1200_1A and the second group 1200_1B may also be disposed to be symmetrical with respect to the virtual straight line passing through the center C of the busbar 60B.

In this case, a fourth angle R4 of the first group 1200_1A may be the same as a fifth angle R5 of the second group 1200_1B. In this case, the fourth angle R4 is an angle which forms a distance between the second protrusions 1230 of the phase terminals 1200_1 of the first group 1200_1A in the circumferential direction, and the fifth angle R5 is an angle which forms a distance between the second protrusions 2230 of the phase terminals 1200_1 of the second group 1200_1B in the circumferential direction. A reference for each of the fourth angle R4 and the fifth angle R5 corresponds to a width center of the horizontal cross section of each of the second protrusions 1230 in the circumferential direction.

A sixth angle R6 between the first group 1200_1A and the second group 1200_1B may also be the same as the fourth angle R4 or the fifth angle R5. In this case, the sixth angle R6 is an angle which forms a distance in the circumferential direction between a second protrusion 1230A of the first group 1200_1A and a second protrusion 1230B of the second group 1200_1B which are adjacent to each other. A reference for the sixth angle R6 corresponds to the width center of the horizontal cross section of each of the second protrusions 1230 in the circumferential direction.

FIG. 20 is a view illustrating the busbar 60B in which the busbar body 1100 includes holes 1102 instead of the third protrusions 1101. Referring to FIG. 20, the busbar 60B may include the holes 1102 instead of the third protrusions 1101. The busbar body 1100 may include the plurality of holes 1102. The plurality of holes 1102 may be concavely formed in an upper surface of the busbar body 1100. The holes 1102 may be coupled to protruding structures of the body surrounding the power terminals. The holes 1102 are also for arranging the positions of the power terminals coupled to the busbar 60B and the second protrusions 1230. Centers of the plurality of holes 1102 may be disposed on the same orbit about the center C of the busbar 60B. The holes 1102 may be disposed not to overlap the second protrusions 1230 in the circumferential direction of the busbar 60B. That is, each of the holes 1102 may be disposed between the adjacent second protrusions 1230 in the circumferential direction of the busbar 60B.

In the above-described embodiments, an example of an inner rotor type motor has been described, but the present invention is not limited thereto. The present invention may also be applied to an outer rotor type motor. In addition, the present invention may be used in various devices for vehicles, home appliances, or the like.

The invention claimed is:

1. A motor comprising:
a shaft;
a rotor coupled to the shaft;
a stator disposed to correspond to the rotor; and
a busbar disposed above the stator,
wherein the stator includes a stator core and coils,
the busbar includes a busbar body and a plurality of terminals disposed on the busbar body,
the terminals include terminal bodies, first protrusions extending from end portions of the terminal bodies and connected to end portions of the coils, and second protrusions branched off from the first protrusions and connected to power terminals, and
the plurality of second protrusions are disposed at the same position in radial and vertical directions of the busbar and disposed at equal intervals in a circumferential direction of the busbar,
wherein the second protrusions are rectangular members of which horizontal cross sections have widths greater than lengths, and a direction of a long side of each of the horizontal cross sections is the radial direction of the busbar.

2. The motor of claim 1,
wherein the busbar body include holes disposed in an upper surface of the busbar body, and the holes are coupled to a body surrounding the power terminals.

3. The motor of claim 2,
wherein plurality of holes are disposed on the same circumference about the center of the busbar.

4. The motor of claim 2,
wherein each of the plurality of holes are disposed between the second protrusions in the circumferential direction of the busbar.

5. The motor of claim 1, wherein shapes and sizes of the plurality of second protrusions are the same.

6. The motor of claim 5, wherein the plurality of terminal bodies are disposed at different positions in a radial direction of the busbar.

7. The motor of claim 1, wherein the terminal bodies include the plurality of first protrusions and the plurality of second protrusions.

8. The motor of claim 1, wherein:
the first protrusions include a 1-1 protrusion and a 1-2 protrusion;
the 1-1 protrusion extends from one end portion of the terminal body and is connected to a first end portion of the coil;
the 1-2 protrusion extends from the other end portion of the terminal body and is connected to a second end portion of the coil;
the second protrusions include a 2-1 protrusion and a 2-2 protrusion;
the 2-1 protrusion is disposed to be branched off from the 1-1 protrusion; and
the 2-2 protrusion is disposed to be branched off from the 1-2 protrusion.

9. The motor of claim 8, wherein, in the radial direction of the busbar:
the 2-1 protrusion is disposed not to overlap the terminal body; and
the 2-2 protrusion is disposed to overlap the terminal body.

10. The motor of claim 1, wherein the busbar body includes a third protrusion protruding upward from an upper surface of the busbar body; and
   the third protrusion is coupled to a body surrounding the power terminal.

* * * * *